(12) United States Patent
Haddad et al.

(10) Patent No.: US 11,789,916 B2
(45) Date of Patent: Oct. 17, 2023

(54) HASH-BASED DUPLICATE DATA ELEMENT SYSTEMS AND METHODS

(71) Applicant: Bank of America Corporation, Charlotte, NC (US)

(72) Inventors: Linda Haddad, Concord, CA (US); Casey Andrew Augustine, Charlotte, NC (US); Katherine Jameson, New York, NY (US); Lauren K. Alleman, Alameda, CA (US); Neha Joshi, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 38 days.

(21) Appl. No.: 17/550,118

(22) Filed: Dec. 14, 2021

(65) Prior Publication Data

US 2023/0185783 A1 Jun. 15, 2023

(51) Int. Cl.
*G06F 16/215* (2019.01)
*G06F 16/93* (2019.01)
*G06F 16/13* (2019.01)
*G06F 16/174* (2019.01)

(52) U.S. Cl.
CPC ............ *G06F 16/215* (2019.01); *G06F 16/93* (2019.01)

(58) Field of Classification Search
None
See application file for complete search history.

(56) References Cited

PUBLICATIONS

R. Barber; Memory Efficient Hash Joins; 2014; Proceedings of the VLDB; p. 353-364 (Year: 2014).*
Narayanan Sundaram; Streaming Similarity Search over one Billion Tweets using Parallel Locality-Sensitive Hashing; 2013; pp. 1930-1941 (Year: 2013).*
"What are Data Silos and What Problems do they Cause," TechTarget, Retrieved on Dec. 13, 2021.
"Hashing vs. Encryption—What are the Difference?" ClickSSL, Jun. 20, 2021.
"Fundamentals of Data Structures: Hashing," Wikimedia Foundation, Inc., Dec. 11, 2019.

* cited by examiner

*Primary Examiner* — Albert M Phillips, III
*Assistant Examiner* — Jermaine A Mincey
(74) *Attorney, Agent, or Firm* — Weiss & Arons LLP

(57) ABSTRACT

A method for reducing a storage of duplicated documents is provided. Methods may include hashing each document stored in the centralized data repository by executing a hashing algorithm on the document, outputting a hash-value and adding the hash-value and a hash pointer to a hash table. Methods may further include crawling the hash table to identify duplicate hash-values. For each hash-value recorded on the hash table two or more times, methods may include combining two or more duplicate hash-values into a cluster and for each cluster identifying, on the hash table, a unique hash-value. For the unique hash-value, methods may include maintaining the unique hash-value on the hash table and maintaining the document corresponding to the unique hash-value in the memory address. For each remaining duplicate hash-value stored in the cluster, deleting the corresponding document from the memory address and store the reference pointer at the memory address.

18 Claims, 10 Drawing Sheets

HASH-BASED DUPLICATE DATA ELEMENT SYSTEMS AND METHODS

FIELD OF TECHNOLOGY

Aspects of the disclosure relate to reducing duplicate data storage. Specifically, aspects of the disclosure relate to reducing duplicate data storage using hash-values generated when hashing stored documents.

BACKGROUND OF THE DISCLOSURE

Large entities manage large amounts of data in their data repositories. This data includes documents, images and data profiles. Stored data also includes modified and/or copied versions of the original data files. These large entities typically control one or more sub-entities. Each sub-entity may independently save documents within its own data repositories, separate from the entity's data repositories. For example, each document received within a sub-entity may be stored within a sub-entity data repository and also be stored at the entity's data repository. As such, it is common for multiples versions of an identical document to be saved on an enterprise system.

Duplicate documents consume unnecessary resources in the data repositories. Furthermore, duplicate documents generate confusion for employers when searching for documents. In addition, duplicate documents generate confusion for clients when the clients are asked to present a previously submitted document.

It would be helpful to provide a document ID system that reduces instances of multiple document occurrences by referring to a document in code form instead of storing the entire document. Hashing is one technique that is used to create a reference code for a document. Implementing hashing algorithms to hash a data element may return a hash-value. Identification of duplicate hash-values may enable identification of a duplicate data element.

It would be desirable, therefore, to leverage hashing to identify duplicate documents stored in enterprise systems. It would be further desirable to remove the identified duplicate documents and consolidate single copy documents in a centralized data repository to reduce complexity, increase speed and improve system efficiency.

SUMMARY OF THE DISCLOSURE

A method for reducing a storage of duplicated documents within a centralized data repository and increasing memory storage space within the centralized data repository is provided. The method may include hashing each document stored in the centralized data repository. The hashing may include executing, using a processor on a computing device, a hashing algorithm on the document. The method may further include outputting, using the processor, a hash-value. The hash-value may be the outcome of the hashing algorithm. The method may further include adding the hash-value and a hash pointer to a hash table. The hash pointer may include a pointer pointing to a memory address included in the centralized data repository where the document is stored.

Following the hashing of each document, the method may include crawling the hash table to identify duplicate hash-values.

For each hash-value recorded on the hash table two or more times, the method may include combining two or more duplicate hash-values into a cluster. It should be appreciated that the hash-value is included in the hash table two or more times when the document corresponding to the hash-value is stored two or more times in the centralized data repository.

For each cluster the method may include identifying, on the hash table, a unique hash-value. the unique hash-value may be one of a one or more duplicate hash-values.

For the unique hash-value the method may include maintaining the unique hash-value on the hash table. The method may also include maintaining the document in the memory address where the document is stored.

For each remaining duplicate hash-value stored in the cluster the method may include deleting the corresponding document from the memory address and in place of the document, the method may include storing the reference pointer at the memory address.

It should be appreciated that the identification and deletion of duplicate hash-values increases memory storage space within the centralized data repository.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
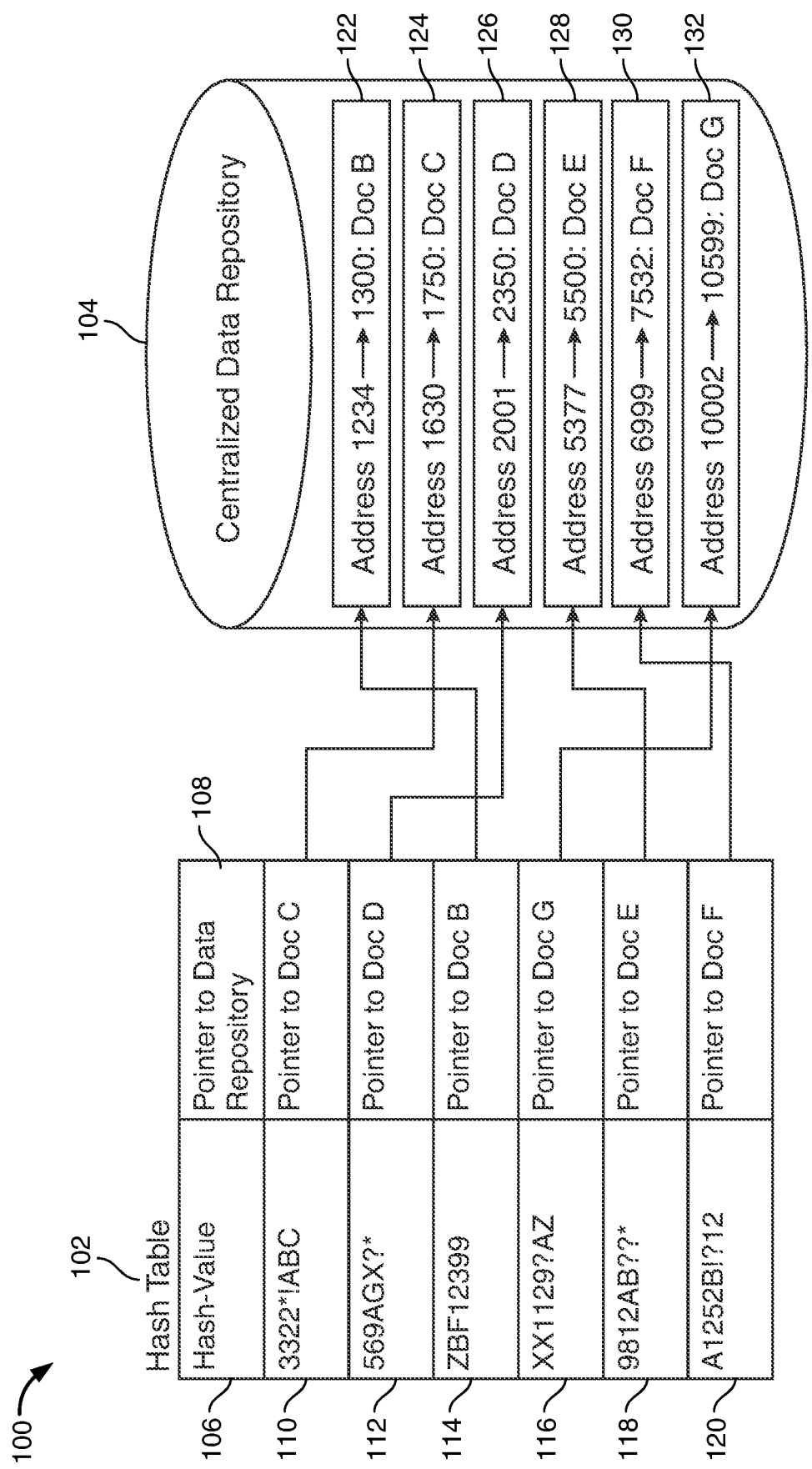
FIG. 1 shows an illustrative diagram in accordance with principles of the disclosure.

Entities create, edit and store hundreds of documents within their system. These documents may be generated by the entity, transmitted to users, re-edited and then stored again. In some instances, many users of the entity may receive a copy of a document for review and then save the document without making any changes. In some instances, the documents are slightly modified. In yet other instances, there are documents that are locked and may never be altered but may be stored within numerous sub-entity data repositories within the system.

Apparatus and methods for reducing a storage of duplicated documents within a centralized data repository and increasing memory storage space within the centralized data repository is provided.

The method may include receiving a data element on a computing device. The data element may include a document. The document may be in plain-text format. The document may be received as a Word® document. The document may be received as a PDF document. The document may be an image such as a .jpeg.

The method may include executing, using a processor on the computing device, a hashing algorithm on the document. There are multiple types of hashing algorithms. Exemplary algorithms that may be used to perform these functions may be one of, but not limited to Message Digest 5 (MD5) and Secure Hashing Algorithm (SHA) 1 and 2.

Following the executing of the hashing algorithm, the method may include outputting, using the processor, a hash-value. The hash-value may be the outcome of the hashing algorithm. Hashing may be performed on small amounts of data as well as large amounts of data.

A hash-value may be a random alphanumerical string generated from hashing the text in the document. A hash-value may also be referred to as a "digital fingerprint" or "digital DNA." Similar to a fingerprint, any slight change in the data of a document may result in a dramatic difference in the resulting hash-values. Thus, a determination whether two documents are identical or not may be determined based on the hash-values returned following the hashing of each document.

Prior to storing the document in the centralized data repository, the method may include comparing, using the processor, the hash-value to a hash table comprising a plurality of non-duplicated hash-values. Each non-duplicated hash-value may correspond to a unique document stored in the data repository.

It should be appreciated that the hash table may record a hash-value for each document stored in the centralized data repository. The hash table may record hash-values for only a subset of the documents that are stored in the centralized data repository. The centralized data repository may include many additional documents not recorded in the hash table.

The hash table may record each unique hash-value. The hash table may also include, corresponding to the hash-value, a pointer pointing to a memory address at the centralized data repository where the corresponding unique document is stored. In some embodiments, the pointer is a hash pointer. In some embodiments, the hash pointer is a combination of the hash-value and the pointer.

The method may also include identifying whether the hash-value is included in the hash table. When the hash-value is included in the hash table, the method may include identifying the hash pointer. The hash-value may be included in the hash table when the document is a duplicate of a document stored in the centralized data repository.

The method may further include storing at a local directory associated with the computing device, the hash pointer. Following the storing, the method may include deleting the document from the local directory. In some embodiments, the storing of the hash pointer may automatically include replacing the document with the hash pointer thereby deleting the document.

In some embodiments, the method may include generating a local pointer at the local directory of the computing device. The local pointer may point to the address of the unique document within the centralized data repository. The local pointer may include the hash pointer.

When the hash-value is not included in the hash table, a duplicate of the document may not exist and the document received may not yet be stored in the centralized data repository.

When the hash-value is not included in the hash table the method may include storing the document in a new memory address. The new memory address may be included in the centralized data repository where the document is now being stored.

The method may further include generating a new hash pointer. The new hash pointer pointing to the new memory location. The method may also include linking the new hash pointer to the hash-value.

The method may also include storing at the local directory associated with the computing device, the new hash pointer. The method may further include adding, the hash-value and the new hash pointer, to the hash table.

The method may further include using the hash-value as a private key to grant user-access to the document. The private key may enable preventing a security breach. Permissions for access to each document may be static and may be accessed based on pre-assigned permissions. In some embodiments, permission for document access may be dynamic and may be changed.

Conventionally, when a user relocated a data element from a first data location to a second data location, such as from a first row within a table to a second row within a table, the access to the data element may be location-based and therefore, the relocating of the data element may disable a user from accessing the data element. Therefore, in order to prevent users from being disabled from accessing data elements even when the data elements are relocated, a hash-based data element access system is provided.

A hash-based data element access system may enable a user to access the document within the database. The hash-based data element access system may provide documents to users that have, or have access to, the hash-value assigned to the document. As such, a hash-value of a document may be the key used to access the document. The hash-value or key may be a private key or a public key. In some embodiments, a user-based private key may combine two or more keys. Each of the two or more keys may include the hash-value as a first key. Each of the two or more keys may also include a rules-based key. The rules-based key may identify the permissions associated with the user and identify that the user has access to the hash-value, or first key. The second key may work in a tree-like formation to show the permissions granted to the user.

When a first permissioned user wants to share the document with a second user that has not yet been granted permission, the first user may forward a key to the second user. The key may include the hash-value of the document. The key may also include the rules-based key indicating the first user's permissions. Once the key is received at the second user, the second user, or an application associated therewith, may modify the rules-based key to show from which user the document was forwarded and current user profile information regarding the second user. The modified key, which may identify the hash-value, the first user's permissions and the second user's permissions may be forwarded to the database for review and retrieval. It should be noted that, at times, although the first user is able to access documents, the first user may not be able to share the permissions with a second user. Such permission information may be included in the rules-based key. Therefore, the database may reject requests that do not correspond to the rules included within the rules-based key. Additionally, the database may need not maintain the rules within the database, as the rules may be dynamic. Furthermore, the rules-based key may be not user readable and may be computer-generated and therefore difficult, if not impossible, for a user to read or alter.

The hash table may include a record of all unique hash-values corresponding to single copy documents stored in the centralized data repository. The centralized data repository may also store numerous additional documents that may not all be unique. Thus, the method may also include implementing a reducing of a storage of duplicate documents previously stored within the centralized data repository that have not yet been reviewed for duplicates.

A plurality of steps may be performed for each previously stored document to reduce duplicates. The first step may include executing, using the processor, the hashing algorithm for each previously stored document. Following the executing, the second step may include outputting, using the processor, a hash-value for each corresponding previously stored document. The third step may include adding the hash-value for each previously stored document to the hash table. The hash table may include a record for each previously stored document within the centralized data repository.

The method may further include crawling the hash table to identify duplicate hash-values. For each hash-value recorded on the hash table two or more times, the method may include combining two or more duplicate hash-values into a cluster. For each cluster the method may include identifying on the hash table, a unique hash-value. The unique hash-value may be one of a one or more duplicate hash-values.

For the unique hash-value the method may include maintaining the unique hash-value on the hash table and maintain the previously stored document corresponding to the unique hash-value at the memory address within the centralized data repository.

For each remaining duplicate hash-value stored in the cluster, the method may include deleting the corresponding previously stored document from the memory address. In place of the previously stored document, the method may include storing the reference pointer at the memory address.

In some embodiments, at the memory address of the previously stored document, an instruction may be stored in place of a pointer. The instruction may include the pointer and may instruct the processor to access the document at the memory address included in the pointer.

A system for reducing and consolidating duplicate document storage in data repositories associated with an entity is provided. The entity may include one or more sub-entities. The entity may include a centralized data repository and a sub-entity data repository associated with each sub-entity.

The system may include a first sub-entity data repository configured for storing documents associated with a first sub-entity. The system may also include a second sub-entity data repository configured for storing documents associated with a second sub-entity. The centralized data repository may be configured for storing a plurality of documents associated with each of the first and second sub-entities.

In some embodiments, each data repository may perform as a data silo. A data silo may be controlled by one sub-entity and may be isolated from the rest of the sub-entities within the entity. Data stored in the sub-entity repositories which may be useful for all sub-entities, may be inaccessible or at least difficult to access by the other sub-entities. It may be accessible by the entity.

Data sets and documents within each data silo may be incompatible with the data sets and documents within another data silo. Although these documents may include identical data they may not be enabled to be shared directly with the other sub-entities. In certain embodiments, however, they may be shared with the entity.

In some embodiments, prior to hashing the documents, an application may be executed on each document to conform all documents to a single standard that may be set by the entity system. This may enable a more accurate and productive search for duplicate documents within all sub-entity data repositories. Data integration may also be implemented to integrate the data silos with the rest of the system. Data integration may be used between the sub-entities so the centralized data repository may contain a unified storage of the documents according to a single standard. Data integration may include extracting, transforming and loading ("ETL") which may extract the data from each sub-entity system and load it into a target centralized data system.

The system may also include a data repository crawler. The data repository crawler may be an application, that when executed, may be configured to crawl each of the first sub-entity data repository and the second sub-entity data repository. The crawler may identify each document stored in the data repositories. The crawler may be configured to extract each document from the first sub-entity data repository and the second sub-entity data repository. The crawler may also be configured to feed each document to a hashing application.

The hashing application may be configured to, for each document, execute a hashing algorithm on the document and output a hash-value for the document. The hashing application may be further configured to identify a hash pointer pointing to a first memory address. The first memory address may be the memory address where the document corresponding to the hash-value is stored. The hashing application may further link the hash pointer to the hash-value The system may include a processor configured to add each hash-value and hash pointer to a hash table. The hash-value may be linked to the hash pointer by the hashing application.

The processor may be configured to search for duplicate hash-values on the hash table. In response to the search, the processor may identify duplicate hash-values. For each hash-value recorded on the hash table two or more times, the processor may be configured to combine two or more duplicate hash-values into a cluster. The duplicate hash-values included in a cluster are generated by hashing duplicate documents stored in the centralized data repository.

For each cluster, the processor may be configured to identify, on the hash table, a unique hash-value. The unique hash-value may be one of a one or more duplicate hash-values.

The processor may be configured to, for the unique hash-value, maintain the unique hash-value on the hash table. The processor may be further configured to transfer the document corresponding to the unique hash-value from the first memory address to a second memory address within the centralized data repository. Following the transfer, the processor may be configured to store a reference pointer at the first memory address that points to the second memory address.

For each remaining duplicate hash-value stored in the cluster, aside from the unique hash-value, the processor may be configured to delete the corresponding document from the first memory address and in place of the document, store the reference pointer at the first memory address. It should be appreciated that the identification and deletion of duplicate hash-values increases memory storage space within the centralized data repository.

In some embodiments, the first sub-entity data repository and the second sub-entity data repository may be data silos. Each data silo may be isolated and/or disconnected from the other data silos.

The transfer of the document from the first memory address to the second memory address, which is a centralized memory address, may enable each of the first sub-entity and the second sub-entity access to the document and retrieval of the document. When a document is stored within the sub-entity data repository and may need to be accessed by multiple sub-entities, this transfer may enable a centralized and accessible data repository. It may further enable reducing requesting from a client, documents that have previously been received from the client but stored within a sub-entity data repository and/or data silo.

In some embodiments, very similar documents may be stored but may not be identical. This will return different hash-values. Similar documents may include almost identical documents but may include a different date, change of a few words or other small and simple differences. For example, a document is created by a user and the document is then saved in the system. Over time, data in the document may need to be changed and/or updated. It is very common to save a revised copy of the document so as not to lose the original document i.e.—a first version. The copy may include only a few changes. The copy may include many changes. The user may rename the document with a similar name but each version of the document is stored in the database as two separate documents. These documents need to be individually maintained in the database. However when searching for duplicate documents, these two documents will generate a different hash-value and both documents may remain in the database as single copy documents. In some embodiments, the hash-value is a randomly generated number. However adding a tag to the hash-value may enable identification of similar documents.

In some embodiments, alongside the hashing of the document, a metadata identification application may be executed on each previously stored document. The metadata identification application may be configured to identify documents that are very similar. This may be performed using methods of keyword searching and optimal character recognition ("OCR.") Following a generating of the hash-value for each document, the metadata identification application may be configured to tag an ID number to each hash-value that corresponds to highly similar documents. For each group of highly similar documents, the ID number may increase by one digit.

For example, if there are 5 documents that are all identified to be almost identical but slightly different, the first hash-value for the first document may include "HashValueofDoc1+A1", wherein 'A' is some known variable. The second hash-value corresponding to the second document may include "Hash-ValueofDoc2+A2. The third hash-value corresponding to the third document may include "HashValueofDoc3+A3." The fourth hash-value corresponding to the fourth document may include "HashValueofDoc4+A4." The fifth hash-value corresponding to the fifth document may include "HashValueofDoc5+A5. Thus, in addition to a hash-value, the additional alpha/numerical code tagged to the hash-value may indicate high similarity between the documents.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative diagram 100. Diagram 100 includes a Centralized Data Repository 104. Centralized Data Repository 104 may be a database for storing documents associated with the entity. Each of the documents may be stored at a memory address within the centralized data repository 104. The memory address may be the location where the actual document is stored within the Centralized Data Repository 104.

Each of the documents stored at 122, 124, 126, 128, 130 and 132 may be recorded on hash table 102. The actual document is not recorded but the hash-value of each document is recorded at column 106 of hash table 102.

At 110, the hash-value of 'Doc C' is recorded and a pointer to the memory address of the location of storage of 'Doc C.' At 112, the hash-value of 'Doc D' is recorded and a pointer to the memory address of the location of storage of 'Doc D.' At 114, the hash-value of 'Doc B' is recorded and a pointer to the memory address of the location of storage of 'Doc B.' At 116, the hash-value of 'Doc G' is recorded and a pointer to the memory address of the location of storage of 'Doc G.' At 118, the hash-value of 'Doc E' is recorded and a pointer to the memory address of the location of storage of 'Doc E.' At 120, the hash-value of 'Doc F' is recorded and a pointer to the memory address of the location of storage of 'Doc F.'

The hash-values recorded at column 106 are each a different value. There are no duplicate hash-values. Since there are no duplicate hash-values, this indicates that each of the corresponding documents of the hash-values are unique. Each of documents stored at 122-132 may be single-copy documents and not duplicates.

There may be numerous additional documents stored at the centralized data repository 104 that may not be illustrated in diagram 100.

Figure 2:
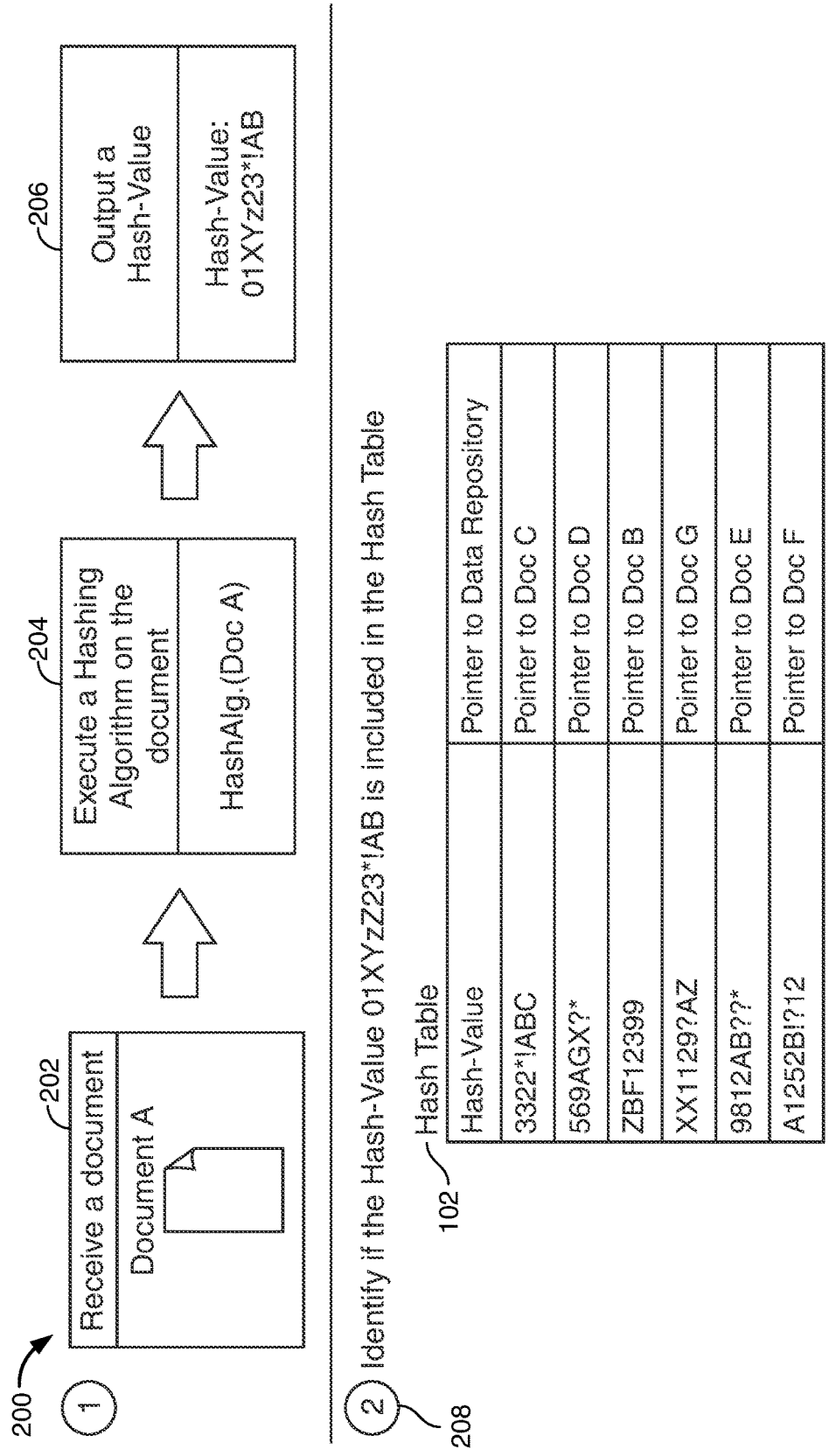
FIG. 2 shows an illustrative flow diagram in accordance with principles of the disclosure.

FIG. 2 shows an illustrative flow diagram of a hash-based data element system 200 for identifying new documents and previously stored documents. At 202 a data element may be received. The data element in this example is 'Document A.' 'Document A' may be received from a client. The document may be received from a user of the system. At 204, a hashing algorithm may be executed on 'Document A.' The hashing algorithm may be performed in order to identify whether duplicates of 'Document A' have already been stored in the system.

At 206 an output of the hash-value may be outputted. The hash-value of 'Document A' is '01XYz23*!AB.' At 208, the system is configured to perform a search at the hash table 102 to identify if the hash-value is already recorded.

At 210, in response to the search the system determines that the hash-value is not recorded at the hash table. Because the hash-value is not included in the hash table, 'Document A' does not yet exist in the system and/or has not yet been stored in the centralized data repository.

At 212, the system is configured to store 'Document A' in the centralized data repository and add the hash-value and the memory address of the location of storage of 'Document A' to the hash table.

Figure 3:
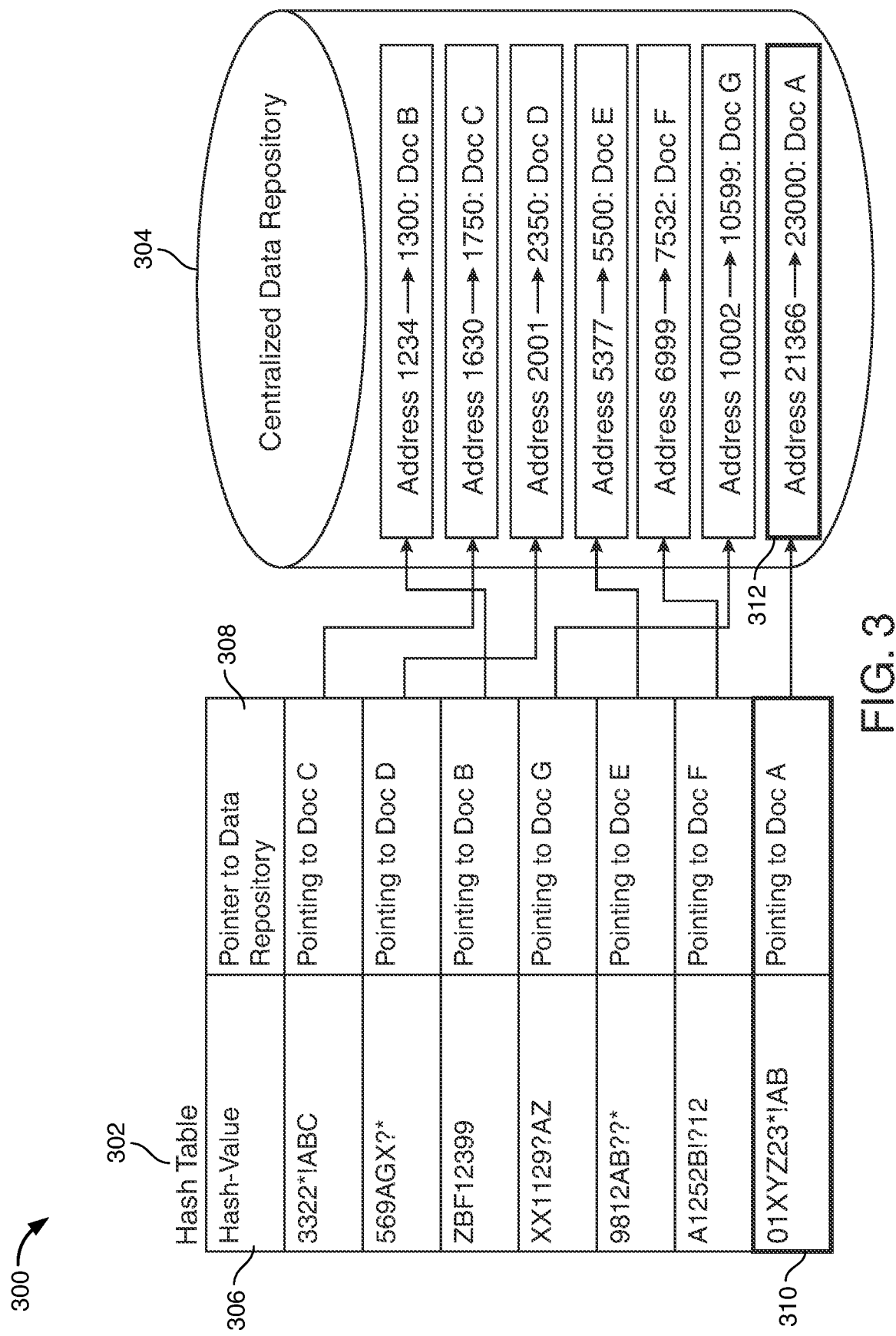
FIG. 3 shows an illustrative diagram in accordance with principles of the disclosure.

FIG. 3 shows an illustrative diagram 300 which reflects the actions and steps shown in FIG. 2. Hash table 302 includes the same data included in hash table 102 with an additional hash-value and pointer stored at the hash table.

At 310, the hash-value of 'Document A' is stored in column 306 and the pointer to the memory address 312 is stored in column 308. The actual document 'Document A' is stored at memory address '21366-23000' within the centralized data repository 304.

Figure 4:
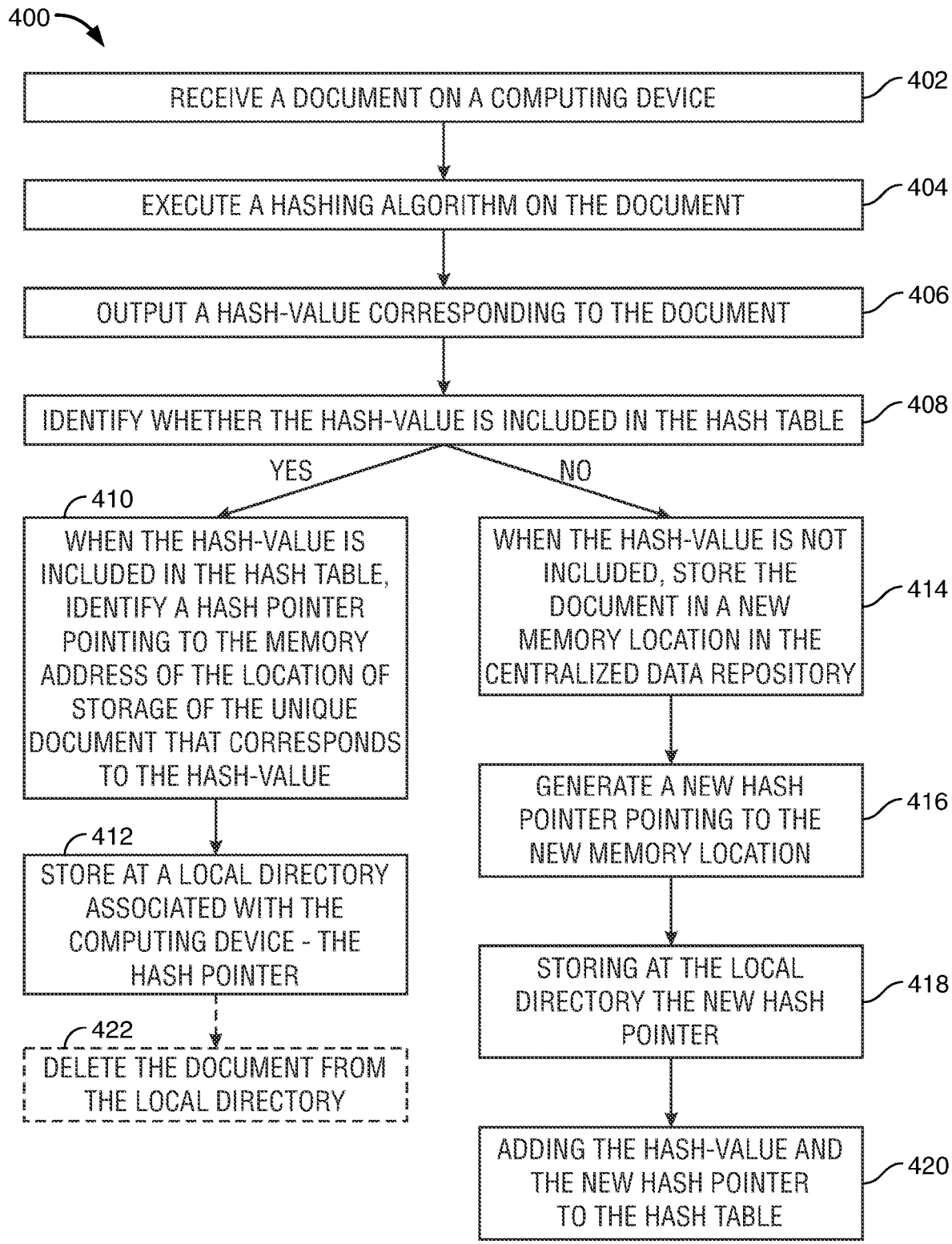
FIG. 4 shows an illustrative flowchart in accordance with principles of the disclosure.

FIG. 4 shows an illustrative flow chart 400 of method steps for identifying duplicate documents prior to storing them.

At step 402, a document may be received on a computing device. At step 404, a hashing algorithm may be executed on the document in order to generate a hash-value of the document. At step 406, a hash-value may be outputted as a result of the hashing. At step 408, the steps may include identifying whether the hash-value is included in the hash table.

When the hash-value is included in the hash table, steps 410, 412 and 422 may be performed. When the hash-value is not included in the hash table, steps 414-420 may be performed.

At step 410, when the hash-value is included in the hash table, a hash pointer of the document may be identified. The hash pointer may include a pointer pointing to the memory address of the location of storage of the unique document that corresponds to the hash-value.

In place of storing the document received, at step 412, the hash pointer may be stored at a local directory. In some embodiments, as shown at step 422, the document received may be deleted from the local directory.

When the hash-value is not included in the hash table, at step 414, the received document is stored in a new memory location within the centralized data repository. Following the storing, a new hash pointer is generated which points to the new memory location, as shown at step 416.

At step 418, the new hash pointer is stored at the local directory for enabling access to the document. It should be appreciated that access to the document may be based on user-permissions included in a user profile. In some embodiments, the hash-value is the private key for enabling access to the document. The user and/or computing device of the user that stores the hash-value may be the 'key' necessary to access the document. When the user does not have the hash-value, the user may not be able to retrieve the document.

At step 420, the hash-value and the new hash pointer may be added to the hash table.

The executing of the hashing algorithm and performing a comparison to identify duplicate hash-values is enabling a decreasing of the storage of unnecessary documents and redundant documents within the databases of an entity's system.

Figure 5:
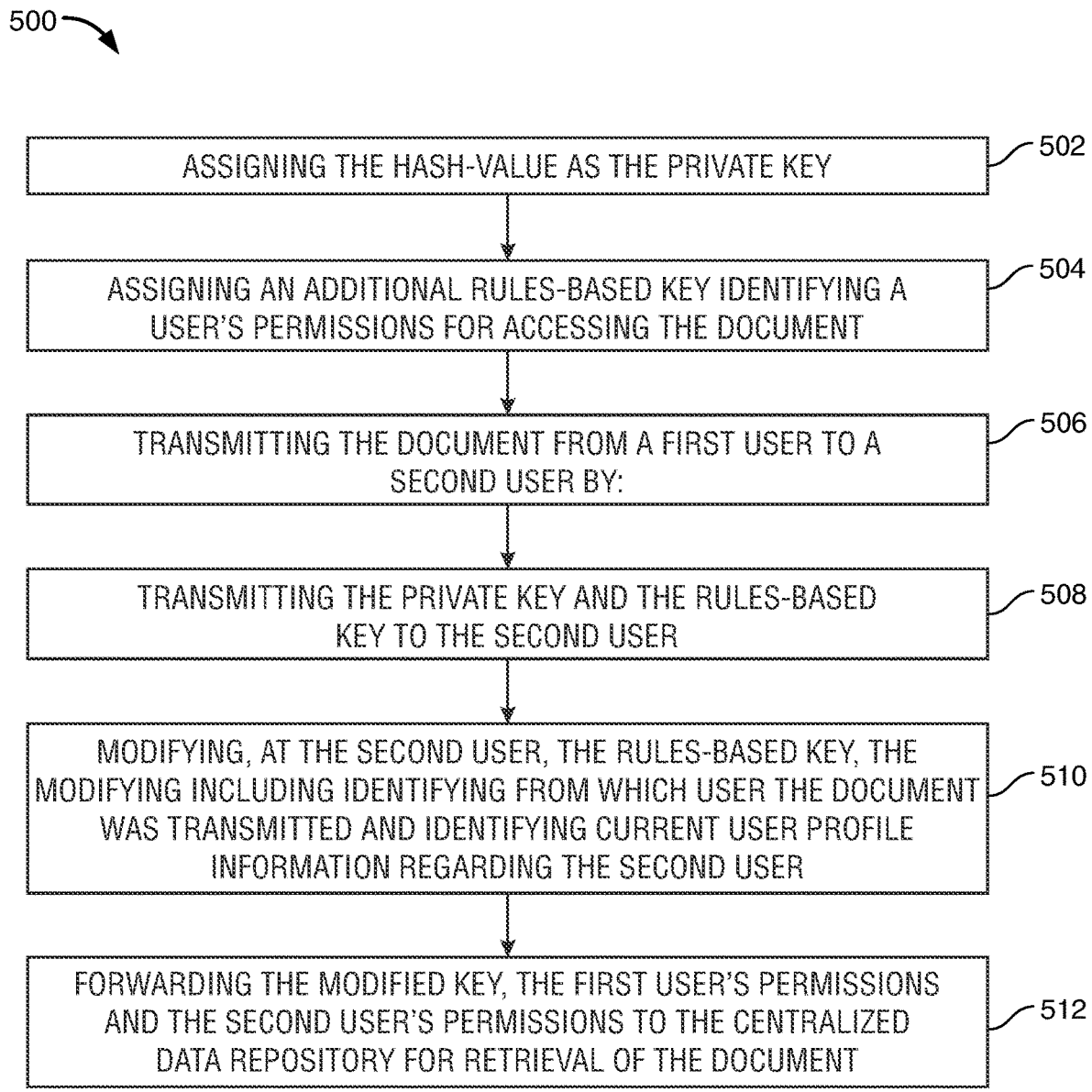
FIG. 5 shows an illustrative flowchart in accordance with principles of the disclosure.

FIG. 5 shows an illustrative flow chart 500. Flow chart 500 may illustrate the steps of implementation of the hash-value as the private key for enabling access to the document. It should be appreciated that there may be different levels of user-access to documents within an entity system. Some documents may always be public. Some documents may be accessed by a first level of users. Some documents may be accessed by more than one level of users.

Having access to the hash-value of a document, and/or obtaining a hash-value of a document, may enable the user's access to the document.

At step 502, the hash-value may be assigned as the private key. The hash-value or key may be a private key or a public key. In some embodiments, a user-based private key may combine two or more keys.

At step 504, an additional rules-based key may be assigned. The rules-based key may identify a user's permissions for accessing the document. Each of the two or more keys may include the hash-value as a first key. Each of the two or more keys may also include the rules-based key. The second key may work in a tree-like formation to show the permissions granted to the user.

At step 506-508, when a first permissioned user wants to share the document with a second user that does not yet have permissions granted, the first user may transmit the document to the second user by transmitting the private key and the rules-based key to the second user.

At step 510, the rules-based key may be modified for the second user. The modifying may include identifying from which user the document was transmitted and further identifying current user profile information regarding the second user.

At step 512, the modified key, the first user's permissions and the second user's permissions may be forwarded to the centralized data repository for retrieval of the document. In some embodiments, the if the permissions do not correspond to the rules included within the rules-based key the request for retrieval of the document may be rejected.

Figure 6:
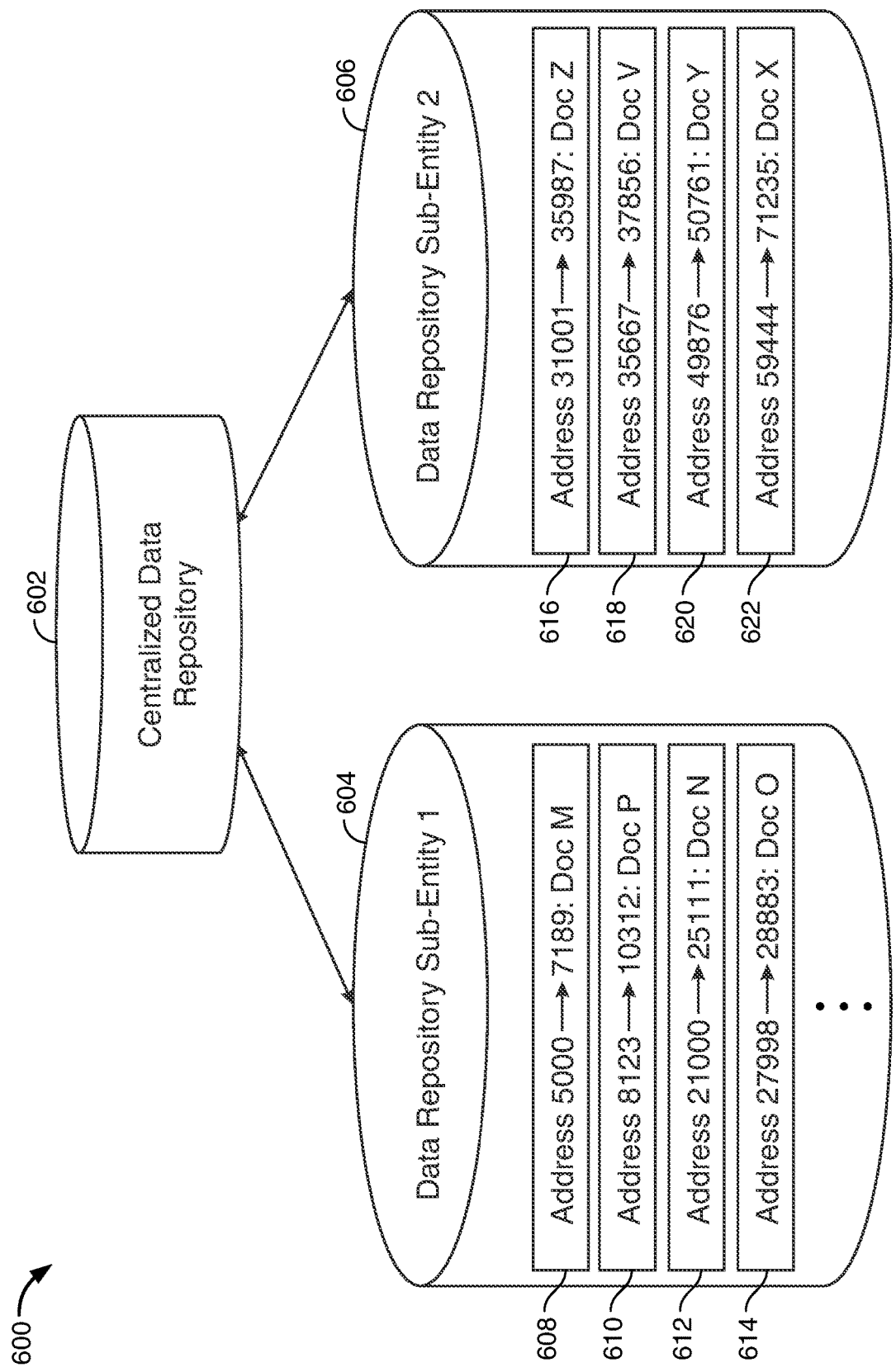
FIG. 6 shows an illustrative diagram in accordance with principles of the disclosure.

FIG. 6 shows an illustrative diagram of an entity system including a centralized data repository 602, a data repository associated with sub-entity one at 604 and a data repository associated with sub-entity 2 at 606.

Data Repository Sub-Entity 1, at 604 may include a storage of documents 'M', 'P', 'N' and 'O.' The data repository may include a storage of numerous other documents not illustrated. 'Document M' may be stored at memory address '5000-7189' as shown at 608. 'Document P' may be stored at memory address '8123-10312' as shown at 610. 'Document N' may be stored at memory address '21000-25111' as shown at 612. 'Document 0' may be stored at memory address '27998-28883' as shown at 614.

Data repository Sub-Entity 2, at 606, may include a storage of documents 'Z', 'V', 'Y' and 'X.' The data repository may include a storage of numerous other documents not illustrated. 'Document Z' may be stored at memory address '31001-35987' as shown at 516. 'Document V' may be stored at memory address '35667-37856' as shown at 518. 'Document Y' may be stored at memory address '49876-50761' as shown at 520. 'Document X' may be stored at memory address '59444-71235' as shown at 522.

The illustrated documents may each be unique documents. The illustrated documents may be duplicates of each other. Some documents may be very similar documents but may include additional editions.

It should be appreciated that the system may not be limited to the two sub-entities illustrated in FIG. 6. The system may include a plurality of additional sub-entities and additional data repositories for the additional sub-entities not illustrated.

Figure 7:
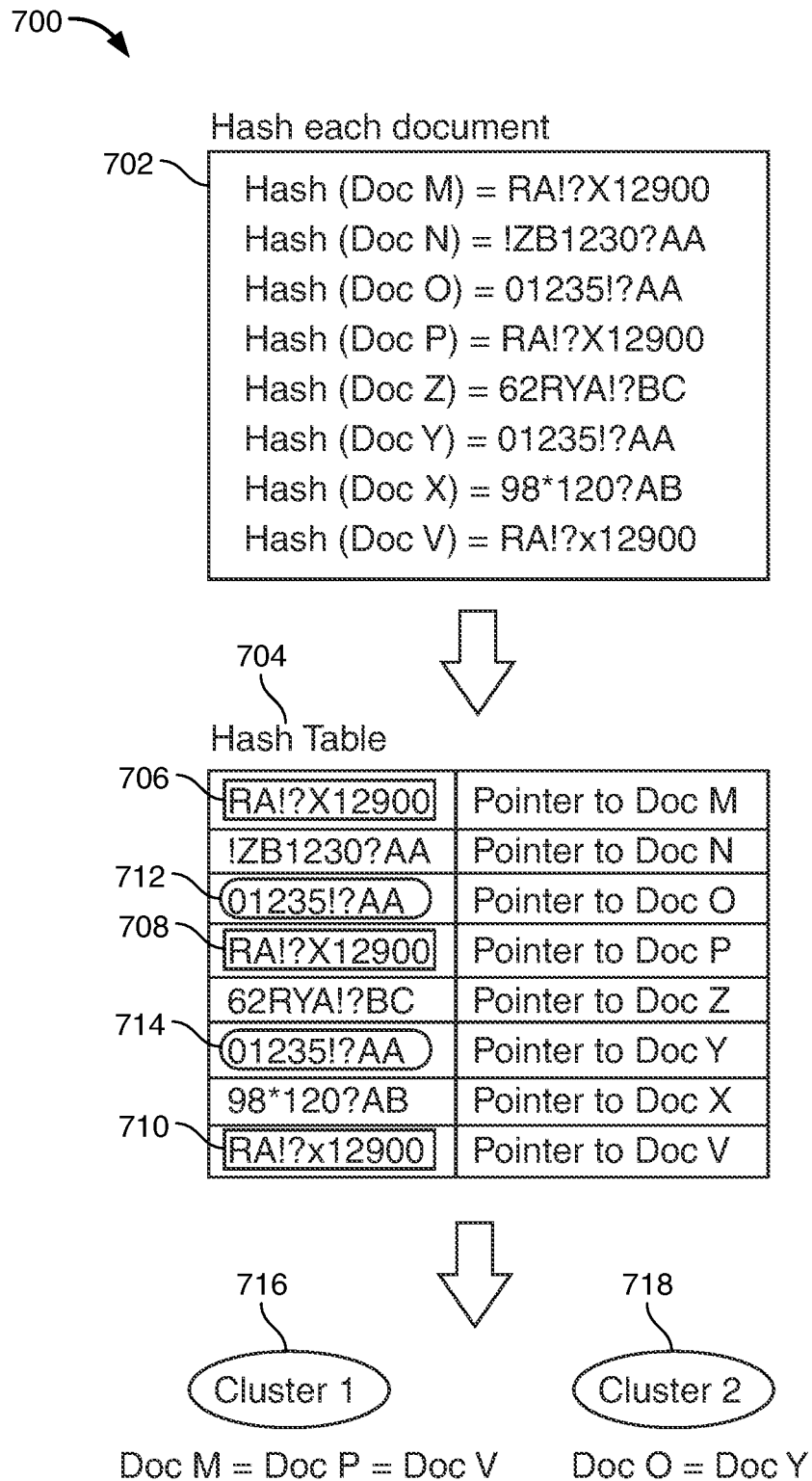
FIG. 7 shows an illustrative flow diagram in accordance with principles of the disclosure.

FIG. 7 shows an illustrative flow diagram 700 for identifying duplicate documents stored in the data repositories illustrated in FIG. 6. At 702, each of the documents stored in sub-entity data repository 1 at 604 and sub-entity data repository 2 at 606 may be extracted from the data repository and hashed. A hashing algorithm may be performed on each of the documents and a hash-value may be outputted as a result of the hashing, as shown at 702.

At 704, the hash-values for each of the documents are recorded in a hash table. A pointer to the memory address that stored the document corresponding to each hash-value is also recorded on the hash table. A duplicate document search is performed to identify whether duplicate hash-values are included in the hash table. Each of the duplicate hash-values are recorded in combination as a cluster as shown at 716 and 718.

The hash-values outputted for 'Document M', 'Document P' and 'Document V' are identical, as shown at 706, 708 and 710. This may indicate that these documents are duplicate documents of each other. There may not be a need to store duplicate documents and the duplicates may be deleted. Documents M, P and V may be included in cluster 1, as shown at 716.

The hash-values outputted for 'Document 0' and 'Document Y' are also identical as shown at 712 and 714. This may indicate that these documents are duplicate documents of each other. Documents 0 and Y may be included in cluster 2, as shown at 718.

Figure 8:
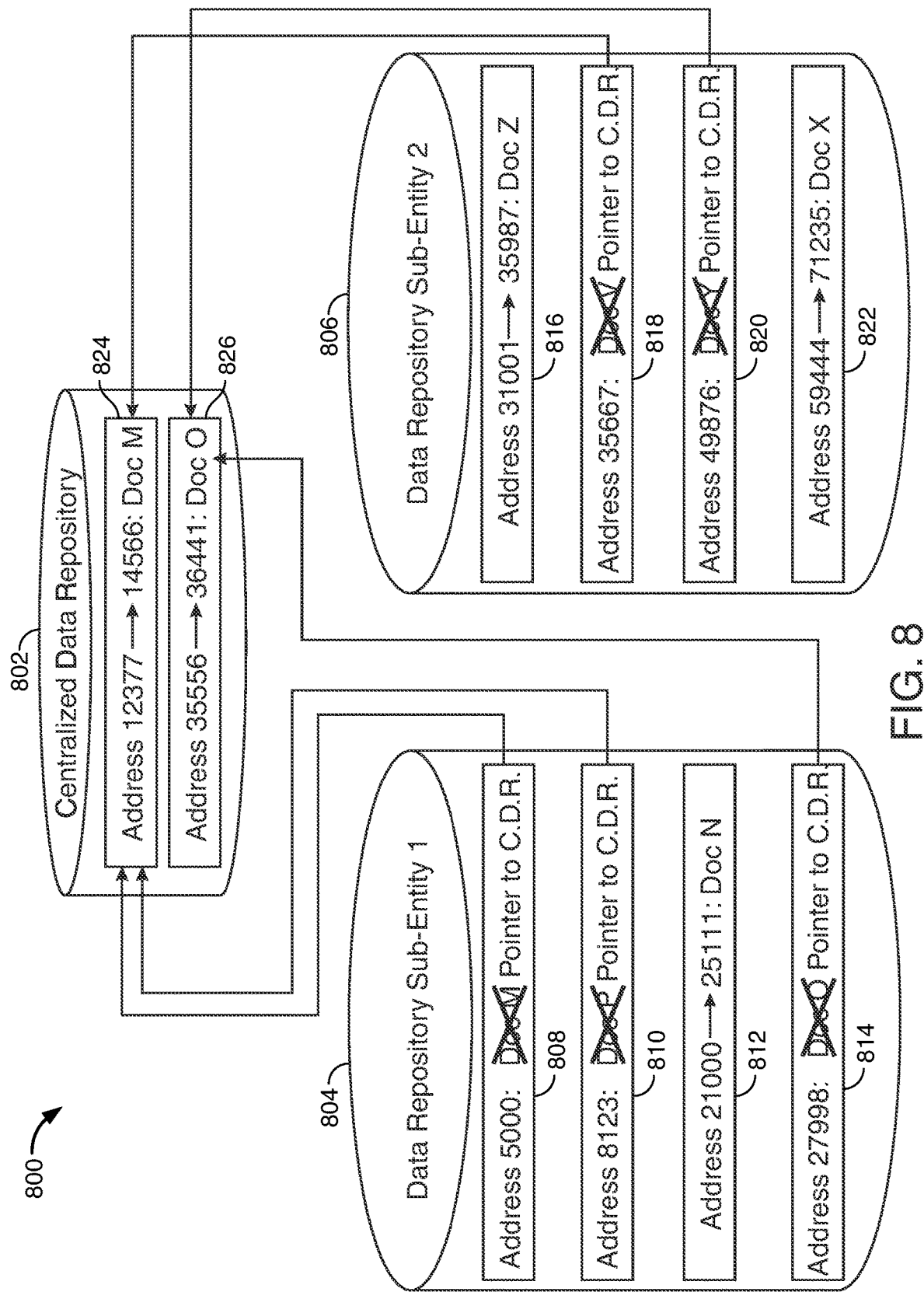
FIG. 8 shows an illustrative diagram in accordance with principles of the disclosure.

FIG. 8 shows an illustrative diagram 800 of the operations being executed within each data repository and between the data repositories 802, 804 and 806. These operations may be performed following, and in response to, the steps performed and described in FIG. 7. The operations may include deleting and transferring of some documents. The operations may also include creating pointers to those documents transferred. The pointers may be stored in place of the deleted documents.

Because 'Doc M', 'Doc P' and 'Doc V' are identical documents, the system may maintain one of the documents and delete the remaining documents. At 808, 'document M' may be transferred to the centralized data repository 802 at memory address 824. In place of the storing of 'Doc M' at 808, a pointer may be stored pointing to the address at 824.

At 810, 'Doc P' may be deleted from the data repository. A pointer to the memory address at 824 may be stored in place of the document. At 812, 'Doc N' is stored and may not be deleted or transferred. No duplicate documents have been identified for 'Doc N.' At 814, 'Doc O' may be transferred to the memory address at 826 within the centralized data repository 802. In place of the storing of 'Doc O', a pointer may be stored pointing to the address at 826.

At 816, 'Doc Z' may remain in storage since a duplicate of the document has not been identified. At 818, 'Doc V' may be deleted. 'Doc V' is a duplicate of 'Doc M' and a pointer to the memory address at 824 may be stored at 818.

At 820, 'Doc Y' may be deleted from the data repository. A pointer pointing to the memory address at 826 may be stored in place of the document at 820. At 822, 'Doc X' may not be removed from the data repository since a duplicate of the document has not been identified.

It should be appreciated that Data repository Sub-Entity 1 at 804 and Data Repository Sub-Entity 2 at 806 may store numerous additional documents not illustrated. Following identification and deletion of all duplicate documents within each data repository, memory storage space may significantly increase and the processing speed of the system may also increase.

It should be appreciated that transferring the documents to the centralized data repository does not take away from the security each document maintains and the permissions granted for access to these documents. User-permissions may be linked to the hash-values and may be maintained when the corresponding documents are transferred and/or deleted.

Figure 9:
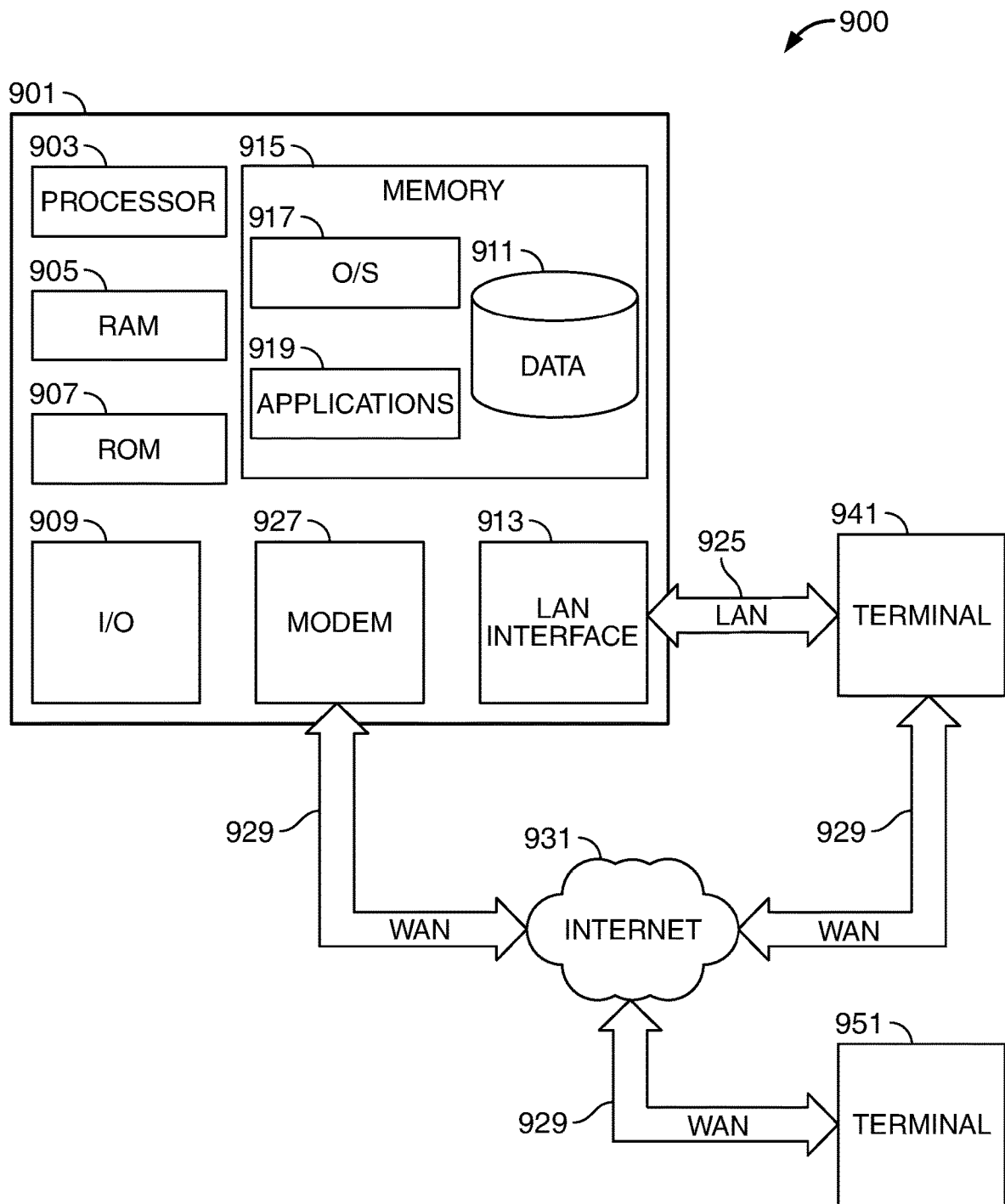
FIG. 9 shows an illustrative block diagram of apparatus in accordance with principles of the disclosure.

FIG. 9 shows an illustrative block diagram of system 900 that includes computer 901. Computer 901 may alternatively be referred to herein as an "engine," "server" or a "computing device." Computer 901 may be a workstation, desktop, laptop, tablet, smart phone, or any other suitable computing device. Elements of system 900, including computer 901, may be used to implement various aspects of the systems and methods disclosed herein. Each of the apparatus illustrated in FIGS. 1 and 8 and/or described herewith, including hash table 102, centralized data repository 104, data repository sub-entity 1 at 804, data repository sub-entity 2 at 806, first sub-entity, second sub-entity, the data repository crawler, the hashing application and processor may include some or all of the elements and apparatus of system 900.

Computer 901 may have a processor 903 for controlling the operation of the device and its associated components, and may include RAM 905, ROM 907, input/output circuit 909, and a non-transitory or non-volatile memory 915. Machine-readable memory may be configured to store information in machine-readable data structures. The processor 903 may also execute all software running on the computer—e.g., the operating system and/or voice recognition software. Other components commonly used for computers, such as EEPROM or Flash memory or any other suitable components, may also be part of the computer 901.

The memory 915 may be comprised of any suitable permanent storage technology—e.g., a hard drive. The memory 915 may store software including the operating system 917 and application(s) 919 along with any data 911 needed for the operation of the system 900. Memory 915 may also store videos, text, and/or audio assistance files. The data stored in Memory 915 may also be stored in cache memory, or any other suitable memory.

Input/output ("I/O") module 909 may include connectivity to a microphone, keyboard, touch screen, mouse, and/or stylus through which input may be provided into computer 901. The input may include input relating to cursor movement. The input/output module may also include one or more speakers for providing audio output and a video display device for providing textual, audio, audiovisual, and/or graphical output. The input and output may be related to computer application functionality.

System 900 may be connected to other systems via a local area network (LAN) interface 913. System 900 may operate in a networked environment supporting connections to one or more remote computers, such as terminals 941 and 951. Terminals 941 and 951 may be personal computers or servers that include many or all of the elements described above relative to system 900. The network connections depicted in FIG. 9 include a local area network (LAN) 1125 and a wide area network (WAN) 929, but may also include other networks. When used in a LAN networking environment, computer 901 is connected to LAN 925 through a LAN interface or adapter 913. When used in a WAN networking environment, computer 901 may include a modem 927 or other means for establishing communications over WAN 929, such as Internet 931.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 919, which may be used by computer 901, may include computer executable instructions for invoking functionality related to communication, such as e-mail, Short Message Service (SMS), and voice input and speech recognition applications. Application program(s) 919 (which may be alternatively referred to herein as "plugins," "applications," or "apps") may include computer executable instructions for invoking functionality related to performing various tasks. Application programs 919 may utilize one or more algorithms that process received executable instructions, perform power management routines or other suitable tasks. Application programs 919 may utilize one or more decisioning processes for the processing of calls received from calling sources as detailed herein.

Application program(s) 919 may include computer executable instructions (alternatively referred to as "programs"). The computer executable instructions may be embodied in hardware or firmware (not shown). The computer 901 may execute the instructions embodied by the application program(s) 919 to perform various functions.

Application program(s) 919 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with database 911, and any other suitable information, may be stored in memory 915. One or more of applications 919 may include one or more algorithms that may be used to implement features of the disclosure comprising the crawling of the data repositories, the hashing of the documents, the sharing of documents between users while maintaining security of the documents and the deleting and transferring of documents within and between data repositories.

The invention may be described in the context of computer-executable instructions, such as applications 1119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 901 and/or terminals 941 and 951 may also include various other components, such as a battery, speaker, and/or antennas (not shown). Components of computer system 901 may be linked by a system bus, wirelessly or by other suitable interconnections. Components of computer system 901 may be present on one or more circuit boards. In some embodiments, the components may be integrated into a single chip. The chip may be silicon-based.

Terminal 951 and/or terminal 941 may be portable devices such as a laptop, cell phone, Blackberry™, tablet, smartphone, or any other computing system for receiving, storing, transmitting and/or displaying relevant information. Terminal 951 and/or terminal 941 may be one or more user devices. Terminals 915 and 941 may be identical to system 900 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 10:
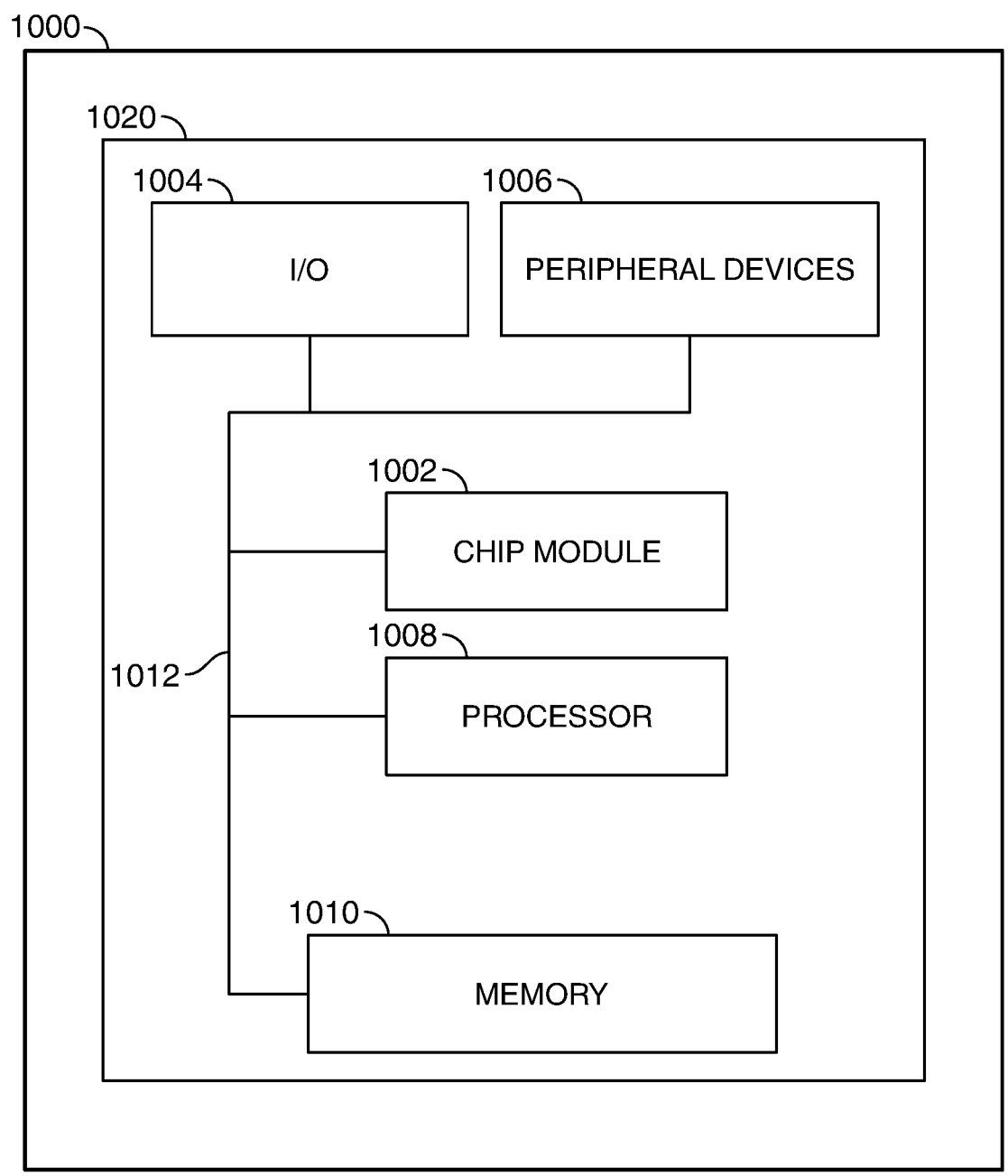
FIG. 10 shows illustrative apparatus that may be configured in accordance with principles of the disclosure.

FIG. 10 shows illustrative apparatus 1000 that may be configured in accordance with the principles of the disclosure. Apparatus 1200 may be a computing device. Apparatus 1000 may include one or more features of the apparatus shown in FIGS. 1 and 8 and described in the disclosure. Apparatus 1000 may include chip module 1002, which may include one or more integrated circuits, and which may include logic configured to perform any other suitable logical operations.

Apparatus 1000 may include one or more of the following components: I/O circuitry 1004, which may include a transmitter device and a receiver device and may interface with fiber optic cable, coaxial cable, telephone lines, wireless devices, PHY layer hardware, a keypad/display control device or any other suitable media or devices; peripheral devices 1006, which may include counter timers, real-time timers, power-on reset generators or any other suitable peripheral devices; logical processing device 1008, which may compute data structural information and structural parameters of the data; and machine-readable memory 1010.

Machine-readable memory 1010 may be configured to store in machine-readable data structures: machine executable instructions, (which may be alternatively referred to herein as "computer instructions" or "computer code"), applications such as applications 1019, signals, and/or any other suitable information or data structures.

Components 1002, 1004, 1006, 1008 and 1010 may be coupled together by a system bus or other interconnections 1012 and may be present on one or more circuit boards such as 1020. In some embodiments, the components may be integrated into a single chip. The chip may be silicon-based.

Thus, systems and methods for reducing a storage of duplicated documents within a centralized data repository and increasing memory storage space within the centralized data repository are provided. Persons skilled in the art will appreciate that the present invention can be practiced by other than the described embodiments, which are presented for purposes of illustration rather than of limitation.

What is claimed is:

1. A method for increasing memory space on a hard drive reducing a storage of duplicated documents within a centralized data repository associated with an entity, the method being performed on previously stored documents and on each newly received document, the method comprising:
    converting a document received on a computing device to a uniform single standard format set by the entity;
    following the converting, hashing all text included in the document using a hashing algorithm, via a processor on the computing device;
    outputting, as a result of the hashing, using the processor, a hash-value, the hash-value being a digital fingerprint of the document in a form of a random alphanumerical string, wherein any change in a text of the document prior to hashing results in a different hash-value;
    prior to storing the document in the centralized data repository, determining whether the document is a duplicate of an already stored document, the determining comprising:
        comparing, using the processor, the hash-value to a hash table comprising a plurality of non-duplicated hash-values, each non-duplicated hash-value corresponding to a unique document stored in the centralized data repository;
    when the hash-value is included in the hash table, the method comprises:
        identifying a hash pointer pointing to a memory included in the centralized data repository where the unique document that corresponds to the hash-value is stored;
        in place of storing the document, storing the hash pointer at a local directory associated with the computing device; and
        deleting the document from the local directory; and
    when the hash-value is not included in the hash table, the method comprises:
        storing the document in a new memory address, the new memory address included in the centralized data repository where the document is being stored when the hash-value is not included in the hash table;
        generating a new hash pointer, the new hash pointer pointing to the new memory address;
        linking the new hash pointer to the hash-value;
        storing at the local directory associated with the computing device, the new hash pointer; and
        adding, the hash-value and the new hash pointer, to the hash table; and
    reducing storage of duplicate documents previously stored within the centralized data repository that have not yet been reviewed for duplicates, the reducing comprising for each of a previously stored document not yet been reviewed:
        extracting each previously stored document;
        converting each previously stored document format to the uniform single standard format;
        following the converting, executing the hashing algorithm on each previously stored document;
        outputting the hash-value for each previously stored document;
        storing the hash-value on the hash table;
        crawling the hash table to identify duplicate documents by identifying identical hash values;
        for each hash-value recorded twice, combining each hash-value recorded twice into a cluster;
        selecting one of the two duplicate hash-values as a unique hash-value;
        maintaining the previously stored document that corresponds to the unique hash-value at a first memory address within the centralized data repository;
        deleting the previously stored document that corresponds to a second duplicate hash-value within the cluster from a second memory address; and
        storing at the second memory address, a pointer to the first memory address.

2. The method of claim 1 wherein the hash-value is included in the hash table when the document is a duplicate of a document stored in the centralized data repository.

3. The method of claim 1 wherein the hash-value is not included in the hash table when the document is not a duplicate of a document stored in the centralized data repository.

4. The method of claim 1 further comprising generating a local pointer at the local directory of the computing device, the local pointer pointing to the memory address of the unique document within the centralized data repository, the local pointer comprising the hash pointer.

5. The method of claim 1 wherein the hash pointer comprises the hash-value and the memory address.

6. The method of claim 1 further comprising using the hash-value as a private key granting user-access to the document.

7. The method of claim 6 further comprising assigning a rules-based key identifying a user's-permissions for accessing the document.

8. The method of claim 7 wherein each rule implemented on the rules-based key are computer-generated.

9. The method of claim 7 further comprising transmitting the document from a first user to a second user, the transmitting comprising:
    transmitting the private key and the rules-based key to the second user, the rules-based key indicating the first user's permissions;
    modifying, at the second user, the rules-based key, the modifying comprising identifying from which user the document was transmitted and identifying current user profile information regarding the second user; and
    forwarding the modified key, the first user's permissions and the second user's permissions to the centralized data repository for retrieval of the document.

10. The method of claim 1 further comprising deleting the document from the local directory following the storing of the hash pointer at the local directory.

11. A system for increasing memory space on a hard drive by reducing a storage of duplicated documents in data repositories associated with an entity, the entity comprising one or more sub-entities, the entity comprising a centralized data repository and a sub-entity data repository associated with each sub-entity, the system comprising:
 a first sub-entity data repository configured for storing documents associated with a first sub-entity;
 a second sub-entity data repository configured for storing documents associated with a second sub-entity;
 the centralized data repository configured for storing a plurality of documents associated with each of the first sub-entity and the second sub-entity;
 a data repository crawler configured to:
  crawl each of the first sub-entity data repository and the second sub-entity data repository;
  extract each document from the first sub-entity data repository and the second sub-entity data repository;
  convert each document format to a uniform single standard format set by the entity; and
  following the converting, feed each document to a hashing application;
 the hashing application configured to, for each document:
  execute a hashing algorithm on the document;
  output, as a result of the hashing, a hash-value for the document, the hash-value being a digital fingerprint of the document in a form of a random alphanumerical sting, wherein any change in a text of the document prior to hashing, results in a different hash-value;
  identify a hash pointer pointing to a first memory address, the first memory address being a memory address where the document corresponding to the hash-value is stored; and
  link the hash pointer to the hash-value; and
 a processor configured to:
  add each hash-value and hash pointer to a hash table, the hash-value being linked to the hash pointer by the hashing application;
  for each hash-value recorded on the hash table two or more times, combining two or more duplicate hash-values into a cluster; and
  for each cluster:
   identify, on the hash table, a unique hash-value, the unique hash-value being one of a one or more duplicate hash-values;
   for the unique hash-value:
    maintain the unique hash-value on the hash table;
    transfer the document corresponding to the unique hash-value from the first memory address to a second memory address within the centralized data repository; and
    store a reference pointer at the first memory address that points to the second memory address; and
   for each remaining duplicate hash-value stored in the cluster:
    delete the document corresponding to the duplicate hash-value from the first memory address; and
    in place of the document, store the reference pointer at the first memory address;

wherein an identification and deletion of duplicate hash-values increases memory storage space within the centralized data repository.

12. The system of claim 11 wherein the duplicate hash-values included in each cluster are generated by hashing duplicate documents stored in the centralized data repository.

13. The system of claim 11 wherein the first sub-entity data repository and the second sub-entity data repository are data silos, each data silo isolated from the other data silos.

14. The system of claim 13 wherein the transfer of the document from the first memory address to the second memory address enables each of the first sub-entity and the second sub-entity, access to the document and retrieval of the document.

15. The system of claim 11 wherein the hash pointer comprises the hash-value and the memory address.

16. The system of claim 11 wherein the hash-value is a private key granting user-access to the document.

17. A method for reducing a storage of duplicated documents within a centralized data repository and increasing memory storage space within the centralized data repository, the method comprising:
 extracting each document stored in the centralized data repository;
 converting each document format to a uniform single standard format set by an entity associated with the centralized data repository;
 following the converting, hashing each document stored in the centralized data repository, the hashing comprising:
  executing, using a processor on a computing device, a hashing algorithm on the document;
  outputting, using the processor, a hash-value, the hash-value being an outcome of the hashing algorithm, the hash-value being a digital fingerprint of each document in a form of a random alphanumerical string, wherein any change a text of each document prior to hashing, result in a different hash-value; and
  adding the hash-value and a hash pointer to a hash table, the hash pointer pointing to a memory address included in the centralized data repository where the document is stored;
 following the hashing of each document, crawling the hash table to identify duplicate hash-values; and
 for each hash-value recorded on the hash table two or more times:
  combining two or more duplicate hash-values into a cluster; and
  for each cluster:
   identify, on the hash table, a unique hash-value, the unique hash-value being one of a one or more duplicate hash-values;
   for the unique hash-value:
    maintain the unique hash-value on the hash table; and
    maintain the document corresponding to the unique hash-value in the memory address; and
   for each remaining duplicate hash-value stored in the cluster:
    delete the document corresponding to the duplicate hash-value from the memory address; and
    in place of the document, store the hash pointer at the memory address;
 wherein an identification and deletion of duplicate hash-values and corresponding documents increases memory storage space within the centralized data repository.

18. The method of claim 17 wherein the hash-value is included in the hash table two or more times when the document corresponding to the hash-value is stored two or more times in the centralized data repository.

\* \* \* \* \*